US012313471B2

(12) United States Patent
Conrad et al.

(10) Patent No.: US 12,313,471 B2
(45) Date of Patent: May 27, 2025

(54) SYSTEM AND METHOD OF FOOD MAPPING FOR SAFETY COMPLIANCE

(71) Applicant: Fireboard Labs, LLC, Kansas City, MO (US)

(72) Inventors: Theodore Thomas Conrad, Olathe, KS (US); Steven Matthew Briggeman, Kansas City, MO (US); Jason von Nieda, Kansas City, MO (US); Tyler Wells Herrmann, Overland Park, KS (US)

(73) Assignee: Fireboard Labs, LLC, Kansas City, MO (US)

( * ) Notice: Subject to any disclaimer, the term of this patent is extended or adjusted under 35 U.S.C. 154(b) by 276 days.

(21) Appl. No.: 18/053,674

(22) Filed: Nov. 8, 2022

(65) Prior Publication Data

US 2023/0147330 A1 May 11, 2023

Related U.S. Application Data

(60) Provisional application No. 63/276,939, filed on Nov. 8, 2021.

(51) Int. Cl.
| | |
|---|---|
| *G01K 1/22* | (2006.01) |
| *G01K 1/022* | (2021.01) |
| *G01K 1/024* | (2021.01) |
| *G01K 1/24* | (2006.01) |
| *G01K 3/02* | (2006.01) |
| *G01K 3/04* | (2006.01) |

(52) U.S. Cl.
CPC ............. *G01K 1/024* (2013.01); *G01K 1/022* (2013.01); *G01K 2207/06* (2013.01)

(58) Field of Classification Search
CPC ...... G01K 1/022; G01K 2207/02; G01K 3/04; G01K 3/02; G01K 3/005
See application file for complete search history.

(56) References Cited

U.S. PATENT DOCUMENTS

| | | | |
|---|---|---|---|
| 7,075,442 B2 | 7/2006 | Lion et al. | |
| 9,154,559 B1 | 10/2015 | Bovee et al. | |
| 11,293,813 B1* | 4/2022 | Gayer | G01K 1/028 |
| 2005/0157775 A1* | 7/2005 | Chapman | G01K 13/20 |
| | | | 374/185 |
| 2007/0215599 A1 | 9/2007 | Kahler | |
| 2012/0225170 A1 | 9/2012 | Sonnendorfer | |
| 2016/0012337 A1* | 1/2016 | Kaye | G06N 5/04 |
| | | | 706/46 |
| 2016/0377490 A1 | 12/2016 | Nivala et al. | |

(Continued)

OTHER PUBLICATIONS

Acurite Instruction Manual, Digital Cooking Thermometer Models 00278/0282.

(Continued)

*Primary Examiner* — Adnan Aziz
*Assistant Examiner* — Jerold B Murphy
(74) *Attorney, Agent, or Firm* — Hovey Williams LLP

(57) ABSTRACT

A computer-implemented method for food safety mapping. The method includes acquiring, via a wireless receiver, an encoded unique identifier from a label positioned proximate to a food item. The encoded unique identifier is saved in a food item record of a database. Current food temperature data for the food item is acquired via a temperature sensor and saved in the food item record.

18 Claims, 4 Drawing Sheets

(56) References Cited

U.S. PATENT DOCUMENTS

2017/0229000 A1* 8/2017 Law .................. G06K 19/0717
2022/0049992 A1 2/2022 Nivala et al.
2022/0053975 A1 2/2022 Young

OTHER PUBLICATIONS

Amazon Alexa Blog Article—Coming Soon: Updated Smart Home Skill API Enables Alexa to Control More Types of Cooking Appliances (Sep. 25, 2019).
Combustion Inc. Start Cooking—Getting Started Using Your Thermometer, https://combustion.inc/pages/start (Dec. 1, 2022).
Combustion Inc. Thermometer https://combustion.inc/ (printed Jan. 23, 2023).
Maverick BT-30 Stake Bluetooth Truly Wireless Intelligent Food Thermometer https://www.maverickthermometers.com/product/bt-30-bluetooth-stake-truly-wireless-intelligent-food-thermometer/ (printed Jan. 23, 2023).
Meat Perfection—The Smart Wireless Meat Thermomotor https:// https://themeatstick.com/ (printed Jan. 23, 2023).
Tappecue AirProbe2 https://www.tappecue.com/airprobe2 (printed Jan. 23, 2023).

* cited by examiner

SYSTEM AND METHOD OF FOOD MAPPING FOR SAFETY COMPLIANCE

RELATED APPLICATIONS

The present application claims priority to U.S. Provisional Patent Application Ser. No. 63/276,939, filed Nov. 8, 2021, and entitled CLOUD CONNECTED SMART INSTANT READ THERMOMETER, the entirety of which is hereby incorporated by reference herein.

FIELD OF THE DISCLOSURE

The field of the disclosure relates generally to food safety compliance and, more particularly, to a system and method for digital food mapping within a food establishment.

BACKGROUND OF THE DISCLOSURE

Food establishments, such as restaurants, catered feeding locations, catering operations and the like, which directly or indirectly vend or provide food, and other food preparation operations, are often subject to laws and regulations governing food safety, equipment layout and operation. For example, such regulations may specify requirements for lighting, sanitation procedures, equipment spacing and dimensions, food temperature, food storage and cooking procedures, and other aspects of food establishment operation.

Existing methods and systems for assessing and maintaining compliance with food safety regulations include periodic audits conducted by management and/or third party inspectors, with the aim of establishing and observing best practices for alignment with the regulations.

However, existing methods and systems are imprecise, offer suboptimal visibility into day-to-day compliance, and exact a high administrative burden on food establishments. There is a need for improved methods and systems enabling swift, continuous and accurate mapping and tracking of regulated operational aspects of food establishments.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer-implemented method for food safety mapping is provided. The method includes acquiring, via a wireless receiver, an encoded unique identifier from a label positioned proximate to a food item. The encoded unique identifier is saved in a food item record of a database. Current food temperature data for the food item are acquired via a temperature sensor and saved in the food item record. The method may include additional, less, or alternate actions, including those discussed elsewhere herein.

In another aspect, a system for food safety mapping is provided. The system includes a thermometer comprising a wireless receiver, a thermal probe, one or more processors and non-transitory computer-readable storage media having computer-executable instructions thereon. When executed by the one or more processors of the thermometer, the instructions cause the one or more processors to acquire, via the wireless receiver, an encoded unique identifier from a label positioned proximate to a food item and to acquire, via the thermal probe, current food temperature data for the food item. The system also includes a mobile electronic device having a wireless communication transceiver, a user interface, one or more processors and non-transitory computer-readable storage media having computer-executable instructions thereon. When executed by the one or more processors of the mobile electronic device, the instructions cause the one or more processors to: acquire, via the user interface, metadata regarding the food item; save, in a food item record of a database of a memory element, the encoded unique identifier with the metadata; and to save, in the food item record of the database, the current food temperature data. The system may include additional, less, or alternate functionality, including that discussed elsewhere herein.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

Exemplary System

Figure 1:
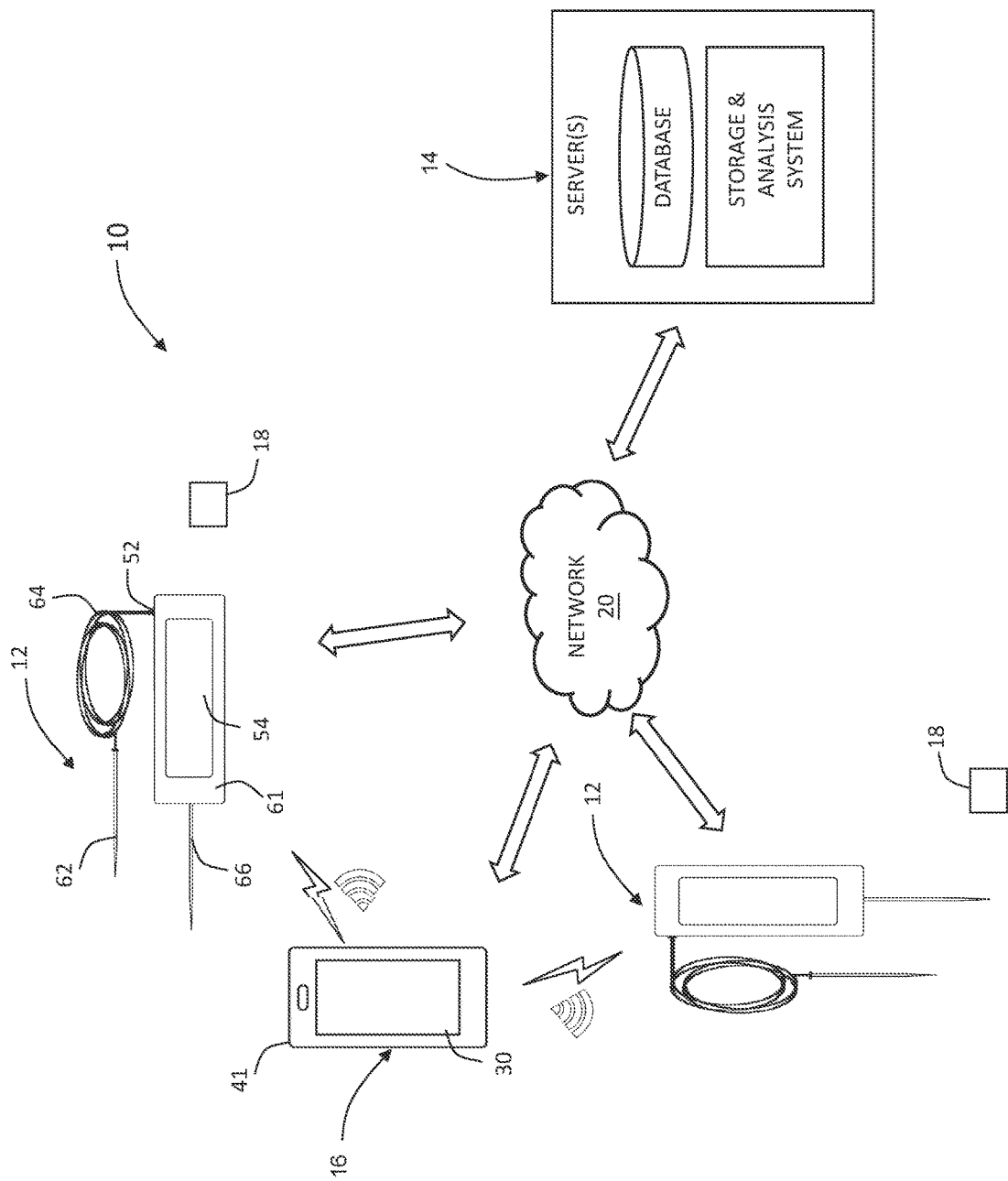
FIG. 1 is a block diagram of an example system for food safety compliance mapping, in accordance with an embodiment of the present disclosure.

FIG. 1 depicts an exemplary environment 10 for food safety compliance mapping according to embodiments of the present invention. The environment 10 may include a plurality of thermal sensors 12 comprising thermometers, one or more server(s) 14, a mobile electronic device 16, a plurality of food labels 18, and a communication network 20. The thermometers 12 and the mobile electronic device 16, and internal portions of the network 20 may be located within network boundaries of an organization, such as a corporation, a government office, or the like. Other portions of the communication network 20 and the server(s) 14 may be external to the organization, for example where the thermometers 12 and the mobile electronic device 16 are individually or collectively configured to submit and request/acquire data to and from one or more third party server(s) 14—such as those existing within a third party cloud infrastructure environment—via application programming interface(s) (APIs) or the like.

Accordingly, the thermometers 12 and mobile electronic device 16 may be connected to an internal network portion of the network 20, the internal network portion being managed by the organization and which may correspondingly comprise a trusted internal network or the like. Alternatively or in addition, the thermometers 12 and mobile electronic device 16 may manage access to the APIs and/or corresponding server(s) 14 under a common authentication management framework. Each user of a thermometer 12 and/or mobile electronic device 16 may be required to complete an authentication process to submit data to and/or access or acquire data from the server(s) 14.

It should be noted, however, that all or some of server(s) 14 may be maintained and/or owned by the organization and/or may be maintained on internal portion(s) of the network 20 within the scope of the present invention. One of ordinary skill will appreciate that the server(s) 14 may be free of, and/or subject to different protocol(s) of, the common authentication management framework within the scope of the present invention.

Figure 2:
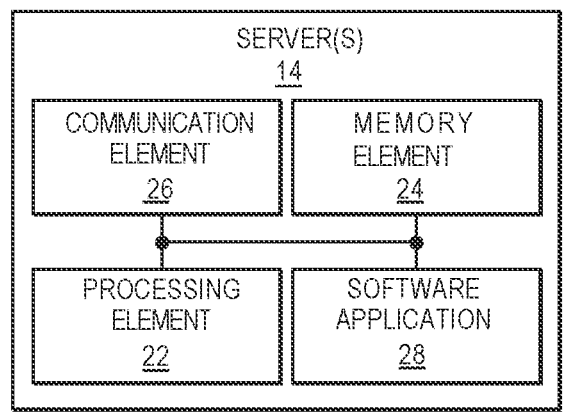
FIG. 2 is a simplified block diagram of an example server for use with the compliance mapping system of FIG. 1.

The server(s) 14 may include a plurality of proxy servers, web servers, communications servers, routers, load balancers, and/or firewall servers, as are commonly known, and may comprise a cloud infrastructure and/or cloud services environment. The server(s) 14 may comprise domain controllers, application servers, database servers, file servers, mail servers, catalog servers or the like, or combinations thereof. The server(s) 14 generally implement a platform for managing receipt, storage, retrieval and analysis of food temperature data and food metadata. In one or more preferred embodiments, the server(s) 14 also store, manage, analyze and identify exceptions violating regulatory rules and requirements applicable to a variety of foods in a variety of uses, locations and situations, as described in more detail below. The server(s) 14 may retain electronic data and may respond to requests to retrieve data as well as to store data. Generally, and with reference to FIG. 2, each server 14 may include a processing element 22, a memory element 24, a transceiver or communication element 26, and a software program 28.

In one or more embodiments, one or more APIs may be maintained by the server(s) 14. The APIs may include and/or provide access to one or more pages or sets of data and/or other content accessed through the World Wide Web (e.g., through the communication network 20) and/or through the internal portion(s) of the network 20. The APIs may be hosted by or stored on a web server and/or database server of the server(s) 14, for example. The APIs may include and/or be access via top-level domains such as ".com", ".org", ".gov", and so forth. The APIs may be accessed using software such as a web browser, through execution of one or more script(s) for obtaining data, and/or by other means for interacting with the APIs without departing from the spirit of the present invention.

The communication network 20 generally allows communication between the thermometers 12, server(s) 14, and mobile electronic device 16. The network 20 may include the Internet, cellular communication networks, local area networks, metro area networks, wide area networks, cloud networks, plain old telephone service (POTS) networks, and the like, or combinations thereof. The network 20 may be wired, wireless, or combinations thereof and may include components such as modems, gateways, switches, routers, hubs, access points, repeaters, towers, and the like. The thermometers 12, server(s) 14 and/or mobile electronic device 16 may, for example, connect to the network 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

Figure 3:
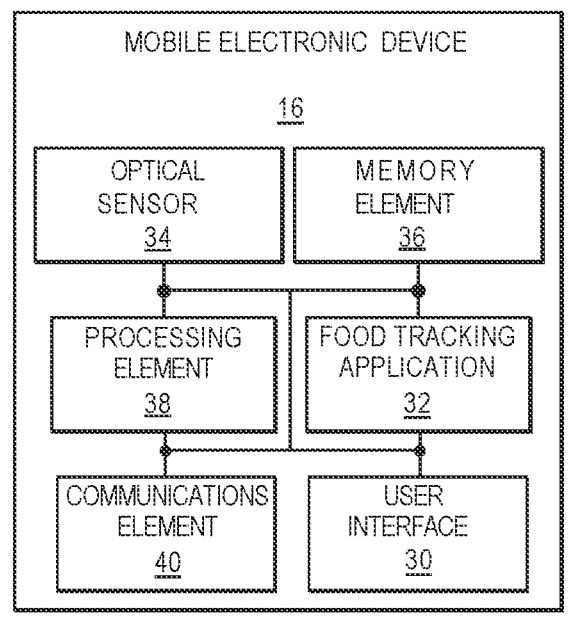
FIG. 3 is a simplified block diagram of an example mobile electronic device for use with the compliance mapping system of FIG. 1.

Turning to FIG. 3, the mobile electronic device 16 can be any computing device capable of interconnecting to the network 20 (e.g., comprising an internal WiFi network and the Internet) and to the thermometers 12, including a mobile web-based device, smartphone, PDA, desktop computer, laptop, smart watch or other mobile web-based connectable equipment. The mobile electronic device 16 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the mobile electronic device 16 is configured to communicate with other user computing devices, the thermometers 12 and/or labels 18 using various forms of communication including, for example, radio frequency communication, near field communication (NFC), network-based communication, WiFi, IEEE 802.16 standards such as WiMAX, Bluetooth™, and the like.

In the exemplary embodiment, the mobile electronic device 16 (e.g., a smartphone or other computing device used by a food establishment employee or other operator) includes a user interface 30 that facilitates user interaction with the mobile electronic device 16. For example, and without limitation, the user interface 30 enables the operator to input information to the mobile electronic device 16, and the mobile electronic device 16 to output information to the operator (e.g., on a display of the mobile electronic device 16). The user interface 30 includes and/or exchanges inputs and outputs with, for example, a digital food tracking application 32 (broadly, a food tracking app), which is installed on the mobile electronic device 16. The exemplary mobile electronic device 16 additionally includes an optical sensor 34, such as a photographic element, as well as processing and communication elements 38, 40, discussed in more detail below. One of ordinary skill will appreciate that the components of the mobile electronic device 16 described herein are preferably integrated into and housed in a body or casing 41 of the device 16.

Figure 4:
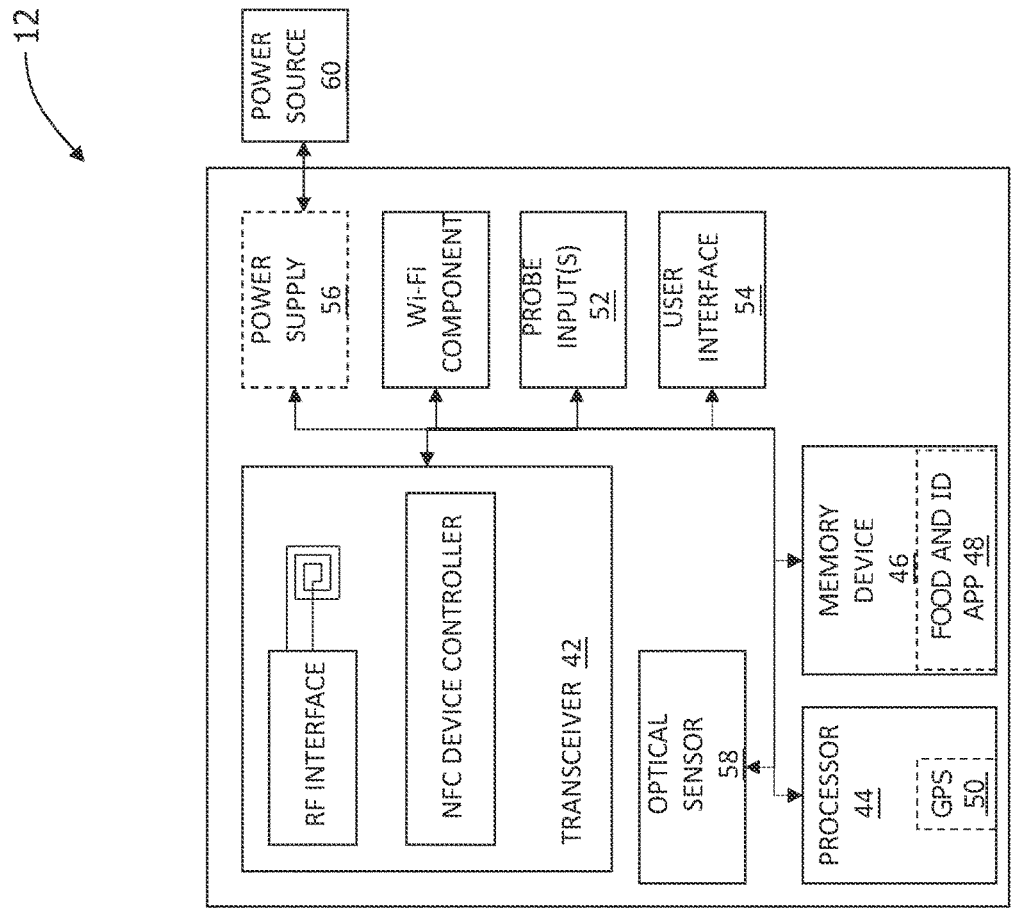
FIG. 4 is a simplified block diagram of an example thermometer for use with the compliance mapping system of FIG. 1.

Turning now to FIG. 4, the thermometers 12 may each include a communications element or transceiver 42, one or more processing elements or processors 44, and a memory element or device 46 configured to store a food tracking app 48 including computer-executable instructions for acquisition, storage and/or transmission of food temperature data and/or food metadata. The thermometers 12 may also each include a geoposition chip or device 50, one or more probe input(s) 52, a user interface 54, a power supply 56, and an optical sensor 58. Each thermometer may receive power from a power source 60 (e.g., alternating current received from a wall electrical outlet or the like). In one or more embodiments, the power supply 56 comprises a rechargeable battery. One of ordinary skill will appreciate that the components of each thermometer 12 described herein are preferably integrated into and housed in a body or casing 61 of each thermometer 12.

A location of the thermometer 12 can be obtained through conventional methods, such as a location service (e.g., global positioning system (GPS) service) implemented via device 16 and food tracking application 32, which may "ping" the chip 50 for data that includes geotemporal data. For example, in one suitable embodiment, chip 50 can be part of or separate from the processor 44 to enable the location of the thermometer 12 to be determined. One of ordinary skill will appreciate that other geolocation methods may be utilized, such as triangulation via multiple proximate Bluetooth™-enabled device signals, without departing from the scope of the present invention.

The one or more probe input(s) 52 may include component(s) for receiving analog thermocouple or thermal probe signals and converting the signals to digital signals for interpretation and storage in the memory device 46. The input(s) 52 may include a port for receiving a plug of an external thermal probe 62 (see FIG. 1), the signal from the thermal probe 62 being transmitted to the input 52 via an electrically conductive wire 64. More generally, each thermometer 12 may also or alternatively include an integral, internal or built-in thermal probe 66. Thermal probe(s) 62, 66 may be inserted into food items (not shown), such as meat or dairy food items, periodically and/or continuously for generation of instant temperature readings and/or temperature profiles over time, as discussed in more detail below.

Each of the user interfaces 30, 54 may include peripheral and/or input/output devices such as, for example, a touch screen. In one or more embodiments, the display can include, for example, and without limitation, a liquid crystal display (LCD), an organic light emitting diode (OLED) display, or an "electronic ink" display. In one or more embodiments, a single component such as a touch screen may function as both an output device and an input device. As such, the display may optionally include a touch controller for support of touch capability. One of ordinary skill will appreciate that various other mobile electronic device types, and diverse input/output means comprising user interfaces, are within the scope of the present invention.

It should also be noted that the food tracking application 32 and food and ID app 48 preferably include computer-readable instructions for respectively providing user interfaces 30, 54 to the operator via the displays of the interfaces 30, 54 and, optionally, receiving and processing input from the interfaces 30, 54. A user interface 30, 54 may accordingly include, among other possibilities, software and hardware features enabling interaction with a web browser and/or the food tracking application 32, food and ID app 48 and/or software application 28 (e.g., via a corresponding API).

User interfaces 30, 54 preferably therefore comprise at least one media output component (e.g., displays) for presenting information to the operator. In one or more embodiments, the media output component includes an output adapter such as a video adapter and/or an audio adapter. An output adapter is operatively coupled to the respective processor 38, 44 and operatively connectable to an output device such as a display device, for example, and without limitation, a liquid crystal display (LCD), organic light emitting diode (OLED) display, or "electronic ink" display, or an audio output device such as a speaker or headphones. In one or more embodiments, such components of the user interfaces 30, 54 accordingly present temperature data, food metadata (e.g., in the form of lists or menus of pre-defined options) and the like to an operator.

The optical sensors 34, 58 respectively may include a camera or other optical sensor and lens combination capable of sensing and capturing light waves and converting corresponding analog signals to digital signals for storage and/or transmission. When the optical sensor 34, 58 captures an image or otherwise generates image data (e.g., video data), the optical sensor 34, 58 may store the image data in a data file, either in a raw or compressed format, in a memory element 36, 46 of the mobile electronic device 16 or thermometer 12 and/or may transmit the data to the server(s) 14 and/or, in the case of acquisition by the thermometer 12, to the mobile electronic device 16.

The transceivers or communication elements 26, 40, 42 may generally allow communication between the thermometers 12, the server(s) 14, the network 20, and/or the mobile electronic device 16. The communication elements 26, 40, 42 may include signal or data transmitting and receiving circuits, such as antennas, amplifiers, filters, mixers, oscillators, digital signal processors (DSPs), and the like. The communication elements 26, 40, 42 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the communication elements 26, 40, 42 may utilize communication standards such as ANT, ANT+, Bluetooth™ low energy (BLE), the industrial, scientific, and medical (ISM) band at 2.4 gigahertz (GHz), or the like. Alternatively, or in addition, the communication elements 26, 40, 42 may establish communication through connectors or couplers that receive metal conductor wires or cables, like Cat 6 or coax cable, which are compatible with networking technologies such as ethernet. In certain embodiments, the communication elements 26, 40, 42 may also couple with optical fiber cables. The communication elements 26, 40, 42 may respectively be in communication with the processing elements 22, 38, 44 and/or the memory elements 24, 36, 46.

The memory elements 24, 36, 46 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In one or more embodiments, the memory elements 24, 36, 46 may be embedded in, or packaged in the same package as, the processing elements 22, 38, 44. The memory elements 24, 36, 46 may include, or may constitute, a "computer-readable medium." The memory elements 24, 36, 46 may store the instructions, code, code segments, software, firmware, programs, applications, apps, services, daemons, or the like that are executed by the processing elements 22, 38, 44. In one or more embodiments, the memory elements 24, 36, 46 respectively store the software applications/programs 28, 32, 48. The memory elements 24, 36, 46 may also store settings, data, documents, sound files, photographs, movies, images, databases, and the like.

The food temperature data and regulatory rule data discussed throughout this disclosure may be stored in databases managed by the server(s) 14 utilizing any of a variety of formats and structures within the scope of the invention. For instance, relational databases and/or object-oriented databases may embody such databases. Also or alternatively, such database(s) may be stored and managed by or on the mobile electronic device 16. The databases may utilize a variety of formats and structures within the scope of the invention, such as Simple Object Access Protocol (SOAP), Remote Procedure Call (RPC), and/or Representational State Transfer (REST) types. One of ordinary skill will appreciate that—while examples presented herein may discuss specific types of databases—a wide variety may be used alone or in combination within the scope of the present invention.

The processing elements 22, 38, 44 may include electronic hardware components such as processors. The processing elements 22, 38, 44 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 38, 44 may include digital processing unit(s). The processing elements 22, 38, 44 may generally execute, process, or run instructions, code, code segments, software, firmware, programs, applications, apps, processes, services, daemons, or the like. For instance, the processing elements 22, 38, 44 may respectively execute the software applications/program 28, 32, 48. The processing elements 22, 38, 44 may also include hardware components such as finite-state machines, sequential and combinational logic, and other electronic circuits that can perform the functions necessary for the operation of the current invention. The processing elements 22, 38, 44 may be in communication with the other electronic components through serial or parallel links that include universal busses, address busses, data busses, control lines, and the like.

Through hardware, software, firmware, or various combinations thereof, the processing elements 22, 38, 44 may—alone or in combination with other processing elements—be configured to perform the operations of embodiments of the present invention described herein. In one or more embodiments, the software applications/programs 28, 32, 48 respectively include instructions executed by the processing elements 22, 38, 44 for performance of the steps and computations described herein. In one or more embodiments, the instructions are configured for execution to perform the step(s) attributable to each device respectively according to the description of the preferred embodiments described herein.

The system 10 also includes labels 18. Labels 18 comprise or store encoded unique identifiers and are positioned proximate respective food items for scanning by the thermometers 12 and/or mobile electronic device 16. In one or more embodiments, unique identifiers server as primary keys in the database(s) maintained by the server(s) 14 and/or mobile electronic device 16, uniquely associated with respective ones of the food items in corresponding food item records. In one or more embodiments, each label 18 may also include and encode food metadata—such as food category/type, food location, and/or associations with certain equipment—for communication to the thermometer 12 and/or mobile electronic device 16 with the unique identifier. In this manner, one of ordinary skill will appreciate that certain food metadata discussed herein may be acquired from the labels 18 also or alternatively to acquisition via user interface(s) 30, 54.

In one or more embodiments, multiple food items may be located variously throughout a food establishment. A label 18 may be positioned proximate (e.g., on, in or within one (1) foot of) each of the food items. Optionally, wherever food metadata is also encoded in the label 18, the positioning of the label 18 may additionally be determined by matching the metadata to the corresponding food item (e.g., to ensure the encoded food type/category or other encoded metadata matches the food item the label 18 is positioned on or adjacent to).

The label 18 may encode a unique identifier visually (i.e., in the form of a one- or two-dimensional visual pattern code, such as a barcode or quick response (QR) code) for scanning by one of the optical sensors 34, 58. Also or alternatively, the label 18 may encode the unique identifier for transmission via radio waves (e.g., via NFC or Bluetooth components). More particularly, in one or more embodiments, the label 18 may include an antenna comprising a looped wire configured to transmit radio signals when current flows through the looped wire. The antenna is any size, shape, and configuration that is suitable for transmitting signals as described herein. For example, the antenna is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna generates a magnetic field when it vibrates at a selected frequency. Specifically, the antenna is configured to vibrate at a frequency of about 13.56 MHz, which is suitable for use in a near field communication (NFC) system.

In the example embodiment, the antenna transmits radio signals to and receives radio signals from other wireless-enabled computing devices, for example, the transceivers 40, 42 of the mobile electronic device 16 and thermometer 12. In NFC systems, for example, at least one NFC component generates a magnetic field to inductively transfer currents and, thereby, exchange signals and information with other NFC components positioned within the magnetic field. In one example embodiment, the antenna functions as an NFC component to send and receive signals. The antenna is configured to transmit radio signals to NFC components positioned within the magnetic field of the antenna, such as when the mobile electronic device 16 or thermometer 12 is located within a predetermined distance of the label 18. Therefore, the magnetic field generated by the antenna defines the active range of the label 18. Additionally, the antenna receives radio signals from NFC components when the antenna is positioned within the magnetic field of the NFC components.

The system may include additional, less, or alternate functionality and/or device(s), including those discussed elsewhere herein. The following detailed description is, therefore, not to be taken in a limiting sense. The scope of the present invention is defined only by the appended claims, along with the full scope of equivalents to which such claims are entitled.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention.

Exemplary Computer-Implemented Method for Food Safety Mapping

Figure 5:
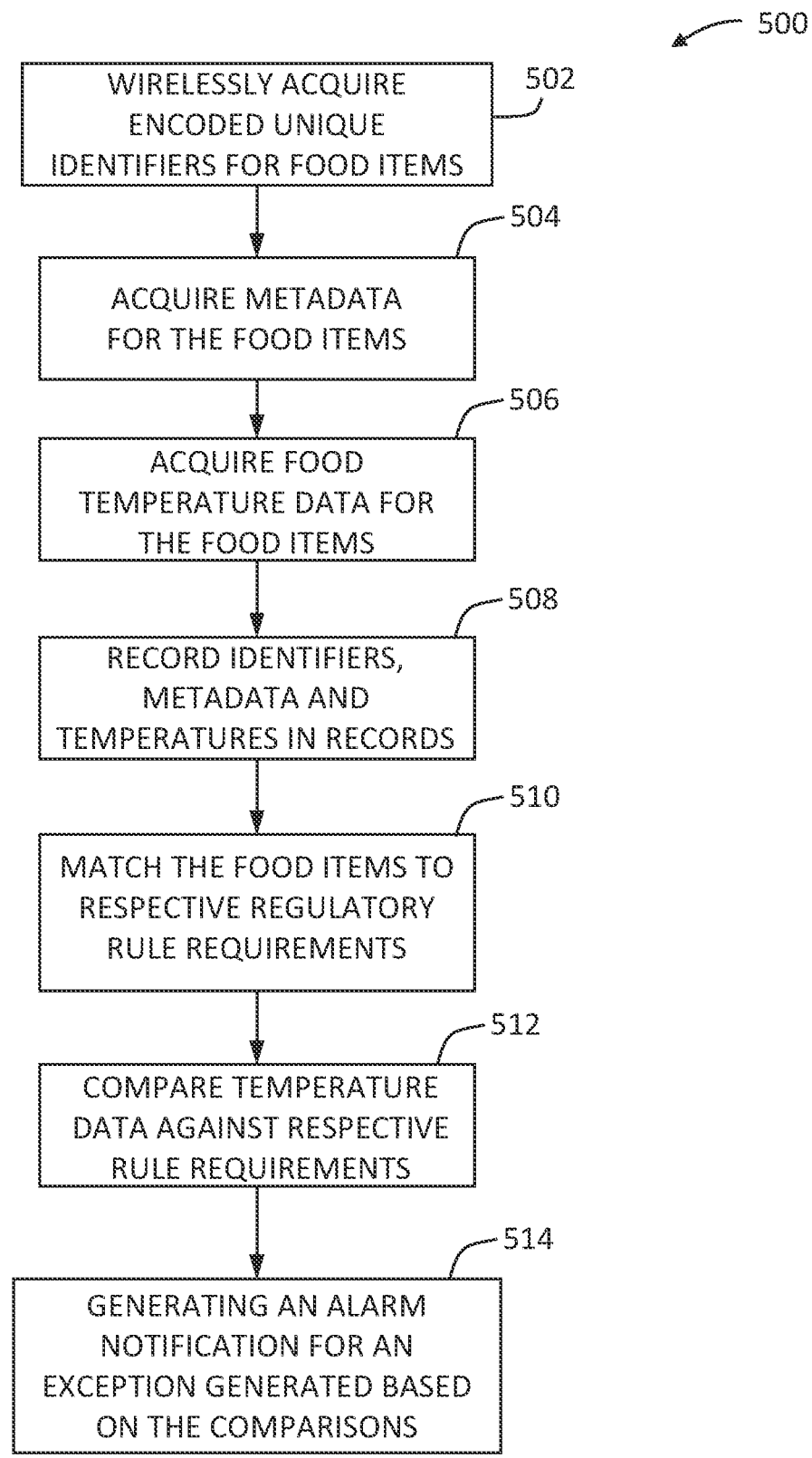
FIG. 5 depicts a flow diagram of an exemplary computer-implemented method for food safety compliance mapping, in accordance with an embodiment of the present disclosure.

FIG. 5 depicts a flowchart including a listing of steps of an exemplary computer-implemented method 500 for food safety mapping. The steps may be performed in the order shown in FIG. 5, or they may be performed in a different order. Furthermore, some steps may be performed concurrently as opposed to sequentially. In addition, some steps may be optional.

The computer-implemented method 500 is described below, for ease of reference, as being executed by exemplary devices and components introduced with the embodiments illustrated in FIGS. 1-4. For example, the steps of the computer-implemented method 500 may be performed by the thermometer(s) 12, the server 14, the mobile electronic device 16, the label(s) 18 and/or the network 20 through the utilization of processors, transceivers, hardware, software, firmware, or combinations thereof. However, a person having ordinary skill will appreciate that responsibility for all or some of such actions may be distributed differently among such devices or other computing devices, or among subsets of the foregoing, without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 502, one or more encoded unique identifiers for corresponding food item(s) may be wirelessly acquired. A transceiver or communication element of a thermometer or mobile electronic device may acquire each encoded unique identifier from a label positioned proximate the corresponding food item.

In one or more embodiments, the communication element may include a wireless receiver—such as an optical sensor or a radio wave receiver or scanner—configured to scan a corresponding element of the label. For example, the label may comprise a one- or two-dimensional visual pattern coding, and the communication element may include an optical sensor for reading the pattern. For another example, the label may comprise an NFC chip or antenna, or another transmitter configured for radio wave transmissions encoding the unique label, and the thermometer or mobile electronic device may be configured to interrogate or otherwise request or cause transmission of the encoded unique label from the label.

The thermometer, mobile electronic device and/or label may additionally include a geoposition chip or the like. The thermometer and/or mobile electronic device may accordingly record a spatial position associated with the label (and, accordingly, the food item) at the time the label is scanned. Current temperature data regarding the food item may optionally be associated with the location, and/or the location may be associated with the unique identifier, as an alternative or additional means for associating temperature data and/or metadata with the food item in question.

It should also be noted that the label may be pre-encoded with other metadata regarding the food item. Accordingly, prior to scanning the label, an operator may match the label—e.g., based at least in part on the metadata pre-encoded thereon, such as food type, food location, equipment type, or the like—to the food item and, based on the matching, place the label into proximity with the food item. In connection with scanning the label, the thermometer and/or mobile electronic device may additionally acquire metadata encoded by the label for storage and association with the unique identifier, food temperature data, and, optionally, location data and/or additional food item metadata entered via a user interface of the thermometer and/or mobile electronic device.

For example, in one or more embodiments, the mobile electronic device and/or server(s) may maintain a layout of the food establishment, with the layout map including features and areas whose characteristics or aspects are relevant to matching food items with regulatory rules (discussed in more detail below). Wherever geoposition or location data is associated with a unique identifier of a label and/or with a food item, the mobile electronic device and/or server(s) may automatically associate the identifier with an area of the food establishment and, accordingly, perform more efficient matching of the food item to a corresponding regulatory rule. For instance, locating a food item on a self-serve counter as opposed to in a storage area of a food establishment—as may be automatically determined from mapping an acquired geolocation to the layout—may change the regulatory rule the food item is analyzed under and/or may alter analysis of or conclusions drawn from application of the regulatory rule.

In one or more embodiments, the mobile electronic device may include a food tracking application configured to set up the thermometers of the exemplary system for electronic communication with one or more server(s), e.g., in a cloud server infrastructure. The cloud server infrastructure may host and manage a platform for managing receipt, storage, retrieval and analysis of food temperature data and food metadata. In one or more preferred embodiments, the server(s) also store, manage, analyze and identify exceptions violating regulatory rules and requirements applicable to a variety of foods in a variety of uses, locations and situations. In one or more embodiments, the food tracking application establishes a Bluetooth™ or similar wireless connection to the thermometers and establishes a WiFi electronic communication connection between the thermometers and the Internet (e.g., to the server(s)).

In one or more embodiments, a thermometer executes a food and ID application or app that automatically instructs acquisition of an encoded unique identifier from a label via a wireless receiver of the thermometer (e.g., an optical sensor or NFC transceiver), for example upon being brought into range of a magnetic field of the label. Upon successful acquisition of the encoded unique identifier, the food and ID app automatically initiates a current food temperature data acquisition mode. The acquired current food temperature data may be recorded in a record with the encoded unique identifier in connection with step 506 below.

In one or more embodiments, the thermometer scans the label to acquire the encoded unique identifier and transmits the identifier, alone or together with current food temperature data discussed in more detail below and/or metadata collected from the label and/or user interface of the thermometer (also as discussed in more detail below), to the mobile electronic device and/or to the server(s) via the communication element. In one or more embodiments, the mobile electronic device also or alternatively scans the label to acquire the encoded unique identifier and transmits the identifier, alone or together with current food temperature data discussed in more detail below and/or metadata collected from the label and/or user interface of the thermometer and/or mobile electronic device, to the server(s) via the corresponding communication element.

As noted above, embodiments of the present invention provide the advantage of enabling swift, continuous and accurate mapping and tracking of regulated operational aspects of food establishments. This advantage is enhanced where multiple thermometers are used simultaneously to label and acquire current food temperature data for multiple food items. Accordingly, in one or more embodiments the step 502 is repeated for each of multiple food items that may be positioned at different locations throughout a food establishment, thereby acquiring a plurality of encoded unique identifiers corresponding to a corresponding plurality of food items.

Referring to step 504, metadata regarding the food item(s) may be acquired. In one or more embodiments, the metadata—e.g., describing a food category or type, a food location, equipment associated with the food at the food establishment, and other data describing the food item—may be encoded by the label and scanned/acquired by the thermometer or mobile electronic device. In one or more embodiments, the metadata may be input at a user interface of the thermometer or mobile electronic device. For example, the food tracking application and/or the food and ID app may include computer-executable instructions for display at a user interface of lists of options for food category or type (e.g., "chicken, pork, beef, steak, milk, cheese" or the like), for food location (e.g., "self-serve counter, cold storage, ambient storage, food prep" or the like), for associated equipment (e.g., "slicer, masher, stove, forming table" or the like), and/or for other important aspects or characteristics of the food items or food establishment.

One of ordinary skill will appreciate that the pre-determined options presented to the operator at the user interface of the mobile electronic device and/or thermometer may be obtained from the memory element(s) of the mobile electronic device and/or the server(s) within the scope of the present invention. The presented options may first be filtered based on initial metadata—e.g., as acquired in the form of encoded metadata from a label—to a more appropriate and focused list of options. For example, where the label provides encoded metadata indicating that the corresponding food item is a cheese, the metadata may be transmitted to the mobile electronic device and/or server, which may return a refined list of options for associated food equipment that excludes devices such as mashers which are typically not associated with cheeses. One of ordinary skill will appreciate that a variety of such pre-filters may be applied to narrow lists of pre-determined metadata options within the scope of the present invention.

It should also be noted that entry of free form metadata for labeling the food item(s) is also within the scope of the present invention.

In one or more embodiments, the thermometer and/or mobile electronic device transmits the metadata, alone or together with the corresponding unique identifier and/or with current food temperature data discussed in more detail below, to the mobile electronic device and/or to the server(s), as the case may be, via the corresponding communication element.

As noted above, embodiments of the present invention provide the advantage of enabling swift, continuous and accurate mapping and tracking of regulated operational aspects of food establishments. This advantage is enhanced where multiple thermometers are used simultaneously to label and acquire current food temperature data for multiple food items. Accordingly, in one or more embodiments the step 504 is repeated for each of multiple food items that may be positioned at different locations throughout a food establishment, thereby acquiring metadata corresponding to the multiple food items.

Referring to step 506, food temperature data is acquired for the food item(s). In one or more embodiments, the food temperature data is acquired by a thermometer for each of a plurality of food items. Each of the thermometers is uniquely associated with a food item identified by an encoded unique identifier acquired in step 502 described above. The current food temperature data may be acquired simultaneously for each of the food items by the respective corresponding thermometers.

The current food temperature data for each of the food items may be acquired by a built-in or integral thermal probe of the thermometer. Also or alternatively, the current food temperature data may be acquired by an external thermal probe of the thermometer, for example a probe, a conductor wire and a plug for removable insertion into a port of the thermometer. The thermal probe may comprise a thermocouple or other temperature sensor configured for producing output comprising analog sensor signals corresponding to food temperature and converting the analog output to digital signals.

The current food temperature data may be collected via an automated process that begins with or is triggered by an operator input and/or by acquisition of the encoded unique identifier of a food item by a thermometer or mobile electronic device from a label positioned proximate the food item. In connection with successful acquisition of the unique identifier, the application of the thermometer or mobile electronic device may automatically begin recording or prepare to begin recording thermal probe sensor output and associating same with the unique identifier. Also or alternatively, the thermal probe sensor output may be recorded and later associated with the unique identifier within a memory element of the system.

The thermal probe sensor output may be automatically converted to digital signals and recorded, or may first be filtered based on a stabilization threshold prior to being recorded or saved for the food item. For example, in one or more embodiments, the sensor output signals may be analyzed to determine a rate of change in sensed food temperature over a unit time (e.g., change per second). Once the rate of change in sensed food temperature is below a stabilization threshold, the thermometer may be configured to capture and record the temperature(s) occurring thereafter.

The current food temperature data may comprise one or more recorded temperatures for the food item. For example, an integral or built-in probe of a thermometer may capture and record an initial temperature for a food item. An external probe of the thermometer may be inserted subsequently into the food item and left inserted for collection of multiple temperatures over time, which may together comprise a temperature profile.

The thermometer may also include a digital clock and/or may obtain a time value over its communication element to associate as a timestamp with each temperature reading of the current food temperature data. Correspondingly, the current food temperature data may be displayed at a user interface of the thermometer and/or mobile electronic device and/or may be analyzed as a time-varying plot or profile of temperature over time.

In one or more embodiments, the thermometer transmits the current food temperature data, alone or together with the corresponding unique identifier and/or with metadata, to the mobile electronic device and/or to the server(s) via the corresponding communication element.

As noted above, embodiments of the present invention provide the advantage of enabling swift, continuous and accurate mapping and tracking of regulated operational aspects of food establishments. This advantage is enhanced where multiple thermometers are used simultaneously to label and acquire current food temperature data for multiple food items. Accordingly, in one or more embodiments the step 506 is repeated for each of multiple food items that may be positioned at different locations throughout a food establishment, thereby acquiring current food temperature data corresponding to the multiple food items.

Referring to step 508, the metadata, current food temperature data, and unique identifier for each food item may be saved in a corresponding food item record of a database. In one or more embodiments, the database is hosted and managed by one of the mobile electronic device and the server(s). One of ordinary skill will appreciate that a variety of computing devices may host and manage the database within the scope of the present invention.

As noted above, embodiments of the present invention provide the advantage of enabling swift, continuous and accurate mapping and tracking of regulated operational aspects of food establishments. This advantage is enhanced where multiple thermometers are used simultaneously to label and acquire current food temperature data for multiple food items. Accordingly, in one or more embodiments the step 508 is repeated for each of multiple food items that may be positioned at different locations throughout a food establishment, thereby recording food item records corresponding to the multiple food items.

Referring to step 510, each food item may be matched against a regulatory rule requirement. In one or more embodiments, an operator may configure the regulatory rule requirement (e.g., by defining a minimum or maximum temperature for the food item). In one or more embodiments, the regulatory rule requirement(s) may be stored in the database or an independent database, and/or may be supplied by one or more regulatory agencies. One of ordinary skill will appreciate that a variety of sources may configure and/or provide rules relating to food item temperature characteristics within the scope of the present invention.

The regulatory rule requirement may be selected by the operator for association with the corresponding food item record, for example where the operator is presented with a pre-determined list of rules from which to select for each of the food items. In one or more embodiments, the pre-determined list of rules is pre-filtered based on metadata acquired (see discussion above) regarding the food item(s). For example, where it is known from the metadata that a food item comprises pork, the pre-determined list of rules may comprise only those determined by a mobile electronic device or server to be potentially relevant to safety compliance of pork food items.

In one or more embodiments, the mobile electronic device and/or server(s) may automatically match each food item with one or more regulatory requirement rules based on the food item metadata. For example, where the metadata indicates that a food item is a "cheese" located in "cold storage," this metadata may be sufficient to match the food item to one or more corresponding rules relating to temperature maintenance over a duration and/or within prescribed limits.

It is also foreseen that an ambient temperature and/or humidity at the food establishment may be periodically or continuously acquired. For example, the ambient temperature and/or humidity may be acquired from the mobile electronic device or from one of the thermometers. In one or more embodiments, the humidity may be acquired by a callout from the food tracking application of the mobile electronic database to a weather application and/or API accessible via a communication network and/or the Internet. In one or more embodiments, the ambient temperature and/or humidity may be used as additional datapoints for matching one or more of the food item(s) to corresponding regulatory rule requirement(s).

In one or more embodiments, the matching regulatory rule requirement(s) for each food item are displayed at a user interface of one or both of the mobile electronic device and corresponding thermometer.

As noted above, embodiments of the present invention provide the advantage of enabling swift, continuous and accurate mapping and tracking of regulated operational aspects of food establishments. This advantage is enhanced where multiple thermometers are used simultaneously to label and acquire current food temperature data for multiple food items. Accordingly, in one or more embodiments the step 510 is repeated for each of multiple food items that may be positioned at different locations throughout a food establishment, thereby matching regulatory rule requirement(s) corresponding to each of the multiple food items. In one or more embodiments, the regulatory rule requirement(s) differ between at least two (2) of the plurality of food items, such as where meat and cheese food items are subject to differing temperature maintenance or profile requirements and/or thresholds.

Referring to step 512, the current food temperature data may be compared against the matched regulatory rule requirement(s). In one or more embodiments, the mobile electronic device and/or server(s) may compare a single temperature of the current food temperature data for the food item against a maximum or minimum temperature prescribed in the matched regulatory rule requirement(s). In one or more embodiments, the mobile electronic device and/or server(s) may compare a temperature profile and/or multiple temperatures occurring over time and labeled with timestamps to a more complex set of maxima and/or minima and/or other requirements relating to temperature prescribed by the regulatory rule requirement(s).

It should also be noted that ambient temperature and/or humidity data, where applicable, may additionally be analyzed when comparing one or more of the current food temperature data to corresponding regulatory rule requirement(s).

One of ordinary skill will appreciate that a variety of regulatory rule requirement(s) may be compared against current food temperature data. For example, it is foreseen that an operator may configure a rule with thresholds reflecting a preferred cooking or cold storage profile, rather than or in addition to a food safety threshold, without departing from the spirit of the present invention.

As noted above, embodiments of the present invention provide the advantage of enabling swift, continuous and accurate mapping and tracking of regulated operational aspects of food establishments. This advantage is enhanced where multiple thermometers are used simultaneously to label and acquire current food temperature data for multiple food items. Accordingly, in one or more embodiments the step 512 is repeated for each of multiple food items that may be positioned at different locations throughout a food establishment, thereby simultaneously tracking conformance of multiple food items with corresponding regulatory rule requirements. Moreover, wherever current food temperature data is periodically or continuously tracked over multiple datapoints for a food item, it is foreseen that such comparison steps may be performed iteratively and in real-time as new ones of the datapoints are acquired from each corresponding thermometer.

As used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Referring to step 514, an exception may be generated corresponding to violation of a regulatory rule requirement by the current food temperature data. In one or more embodiments, the mobile electronic device or server(s) performing the comparison of step 512 may determine that a violation of the corresponding rule has occurred, and may generate an exception describing the violation. For example, the exception may take the form of an alarm notification transmitted from the mobile electronic device and/or server(s) performing the comparison to the mobile electronic device and/or corresponding thermometer(s). The alarm notification may describe the implicated food item(s) and/or the violated regulatory rule requirement(s).

The alarm notification may be automatically issued—e.g., via audible or visible emission—from one or both of the mobile electronic device and corresponding thermometer. In one or more embodiments, the alarm notification may also or alternatively be transmitted in the form of an electronic message to an email server for delivery to an account of the operator and/or in the form of a text message via a short message service (SMS) account associated with the mobile electronic device and/or operator.

In addition, one or more of the unique identifier, metadata, current food temperature data, matched regulatory rule requirement(s), exception(s) and/or alarm notification(s) may also be made available together or individually, for all or some of the food item(s), at a web interface and/or in a structured regulatory report. The web interface and/or regulatory report may be made available for instantaneous access and/or may be periodically transmitted or generated automatically or upon operator request.

The method may include additional, less, or alternate steps and/or device(s), including those discussed elsewhere herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method for food safety mapping, the method comprising:
   acquiring, via a wireless receiver, an encoded unique identifier from a label positioned proximate to a food item;
   saving, in a database of a memory element, the encoded unique identifier in a food item record;
   acquiring, via a temperature sensor, current food temperature data for the food item, the temperature sensor including a thermometer having a thermal probe, one or more processors and non-transitory computer-readable storage media having computer-executable instructions thereon that, when executed by the one or more processors, cause the one or more processors to—
      analyze sensor output from the thermal probe to determine when a change in temperature for the food item over time is below a threshold,
      based on the determination, capture and transmit the current food temperature data, the current food temperature data corresponding to a subset of the sensor output analyzed to make the determination; and
   saving, in the food item record of the database, the current food temperature data.

2. The computer-implemented method of claim 1, further comprising—
   acquiring, via a user interface, metadata regarding the food item,
   saving the metadata in the food item record, wherein—
      the user interface comprises a smart phone,
      the memory element comprises a cloud server,
      the wireless receiver comprises the thermometer.

3. The computer-implemented method of claim 2, wherein the smart phone includes one or more second processors and second non-transitory computer-readable storage media having second computer-executable instructions thereon that, when executed by the one or more second processors, cause the one or more second processors to—
   link the thermometer to a local wireless communication network to facilitate electronic communication between the thermometer and the cloud server,
   receive the metadata via the user interface of the smart phone,
   transmit the metadata to the cloud server over the local wireless communication network for the saving in the food item record with the encoded unique identifier.

4. The computer-implemented method of claim 1,
   the wireless receiver being an optical sensor and the encoded unique identifier being embodied by visual pattern coding in one or two dimensions on the label.

5. The computer-implemented method of claim 1,
the wireless receiver being a wireless communication element configured for receipt of radio waves from the label encoded with the encoded unique identifier.

6. The computer-implemented method of claim 1, further comprising displaying at a user interface of a smart phone the current food temperature data and at least a portion of metadata regarding the food item.

7. A system for food safety mapping, comprising:
a thermometer comprising a wireless receiver, a thermal probe, one or more processors and non-transitory computer-readable storage media having computer-executable instructions thereon that, when executed by the one or more processors, cause the one or more processors to—
  acquire, via the wireless receiver, an encoded unique identifier from a label positioned proximate to a food item,
  acquire, via the thermal probe, current food temperature data for the food item,
  analyze sensor output from the thermal probe to determine when a change in temperature for the food item over time is below a threshold,
  based on the determination, capture and transmit the current food temperature data, and
an electronic device including a wireless communication transceiver and one or more second processors and second non-transitory computer-readable storage media having second computer-executable instructions thereon that, when executed by the second one or more processors, cause the second one or more processors to—
  save, in a database of a memory element, the encoded unique identifier in a food item record,
  save, in the food item record of the database, the current food temperature data.

8. The system of claim 7,
the memory element and database comprising a cloud server.

9. A computer-implemented method for food safety mapping, the method comprising:
acquiring, via a wireless receiver, an encoded unique identifier from a label positioned proximate to a food item;
saving, in a database of a memory element, the encoded unique identifier in a food item record;
acquiring, via a temperature sensor, current food temperature data for the food item;
saving, in the food item record of the database, the current food temperature data;
acquiring, via a second wireless receiver, a second encoded unique identifier from a second label positioned proximate or in contact with a second food item;
acquiring, via a user interface, metadata and second metadata respectively regarding the food item and the second food item;
saving, in the database, the metadata in the food item record;
saving, in the database, the second encoded unique identifier with the second metadata in a second food item record;
acquiring second current food temperature data for the second food item via a second temperature sensor contemporaneously with the acquisition of the current food temperature data via the temperature sensor;
saving, in the second food item record of the database, the second current food temperature data;
matching the metadata to a first regulatory rule for the food item;
matching the second metadata to a second regulatory rule for the second food item;
comparing the current food temperature data to a first requirement of the first regulatory rule to determine whether an exception has occurred; and
comparing the second current food temperature data to a second requirement of the first regulatory rule to determine whether an exception has occurred, the first requirement being different from the second requirement.

10. The computer-implemented method of claim 9,
the metadata and the second metadata each comprising and being matched respectively against the first and second regulatory rules based on at least one of food category, food location, and associated equipment.

11. The computer-implemented method of claim 10, the metadata and the second metadata being selected from pre-determined options displayed at the user interface.

12. The computer-implemented method of claim 10, the metadata and the second metadata respectively comprising first and second food location data acquired from first and second geoposition chips of first and second thermometers respectively comprising the temperature sensor and the second temperature sensor.

13. The computer-implemented method of claim 9, further comprising acquiring an ambient temperature for one or more areas in which the food item and the second food item are located, wherein one or both of the matching of and comparisons to the first and second regulatory requirements are based on the ambient temperature.

14. The computer-implemented method of claim 9,
the temperature sensor comprising a thermometer including an external probe port,
the second temperature sensor comprising a second thermometer including a second external probe port,
the current food temperature data comprising a temperature profile including a plurality of measurement timestamps and a plurality of temperatures acquired by an external probe plugged into the external probe port,
the second current food temperature data comprising a second temperature profile including a second plurality of measurement timestamps and a second plurality of temperatures acquired by a second external probe plugged into the second external probe port.

15. The computer-implemented method of claim 14,
the comparisons including iteratively comparing the temperature profile and the second temperature profile respectively to the first and second requirements as additional ones of the plurality of temperatures and the second plurality of temperatures are acquired.

16. The computer-implemented method of claim 9, wherein one or both of the comparisons result in exception, further comprising generating an alarm notification for issuance via a smart phone comprising the user interface, the alarm notification including a description of the exception.

17. The computer-implemented method of claim 9,
the temperature sensor comprising a thermometer including a built-in probe configured for instant-read measurements to generate the current food temperature data.

18. A computer-implemented method for food safety mapping, the method comprising:
acquiring, via a wireless receiver, an encoded unique identifier from a label positioned proximate to a food item;

saving, in a database of a memory element, the encoded unique identifier in a food item record;
acquiring, via a temperature sensor, current food temperature data for the food item;
saving, in the food item record of the database, the current food temperature data; and
preparing, based on the food item record in the database, a structured regulatory report including at least some of the current food temperature data and metadata.

* * * * *